Patented July 10, 1934

1,966,067

UNITED STATES PATENT OFFICE 1,966,067

PRODUCTION OF MONOCARBOXYLIC ACIDS AND THEIR DERIVATIVES

Alphons O. Jaeger, Mount Lebanon, Pa., assignor to The Selden Company, Pittsburgh, Pa., a corporation of Delaware No Drawing. Application May 27, 1929, Serial No. 366,531

18 Claims. (Cl. 260—136)

This invention relates to the production of monocarboxylic acid substances from polycarboxylic acid substances.

In my prior Patent No. 1,714,956, issued May 28, 1929 of which the present application is in part a continuation, I have described processes of preparing monocarboxylic acid substances from polycarboxylic substances by passing vapors of the substance admixed with hydrogen or other reducing gases over carboxy splitting catalysts. This results in the production of a mixture of aldehydes and monocarboxylic acids, but if the amount of hydrogen is greatly increased, serious losses take place by formation of the corresponding hydrocarbon which is normally of much less value than the aldehydes or acids or even than the initial polycarboxylic acid substance.

I have found that if hydrogen or other reducing gas is used together with oxides of carbon, such as, carbon monoxide or carbon dioxide it is possible to obtain high yields of aldehydes and acids without serious production of hydrocarbon. The reason for the improved results is probably due to the diluting and smoothing action of the oxides of carbon and to the fact that they make it possible to use hydrogen in moderate amounts, but it is possible that other factors enter into the reaction which are not at present definitely determined and the invention is not restricted to any theory of reaction.

Among the polycarboxylic acid substances which may be used are acids, anhydrides, esters, etc., for example, phthalic anhydride, esters of phthalic acid, naphthalic anhydride, diphenic acid, maleic acid, succinic acid, pyrotartaric acid, glutaric acid, adipic acid, etc.; the invention is also applicable to halogen, nitro or amino substituted polycarboxylic acid substances etc. It should be noted of course that the reducing action will sometimes transform nitro groups into amino groups, and in the case of unsaturated polycarboxylic acids such as maleic acid, hydrogenations may also take place, particularly if sufficient hydrogen is used.

The reaction may take place at atmospheric pressure, under a vacuum or at superatmospheric pressure. It is helpful in many cases to use a moderate pressure, for example 3 to 5 atmospheres, though higher pressures may be used. At high pressures, however, there is a tendency for the oxides of carbon themselves to be transformed into reduction products, such as methyl alcohol, methane and the like which in some cases is desirable.

The gaseous medium may be an artifical mixture of hydrogen or other reducing gas and oxides of carbon or mixtures such as water gas or the product obtained by passing water gas and steam over a catalyst which transforms part of the steam into hydrogen, and carbon dioxide may be used. It is very advantageous in many cases to use a circulatory process, removing some of the carbon dioxide or carbon monoxide from the gas stream in any suitable manner at one point in the circuit and adding fresh hydrogen at another point, the reaction products of course being condensed out in the usual manner. Such circulatory processes are very desirable as the oxides of carbon and hydrogen are not wasted and a very smooth control is possible. The invention however includes both circulatory processes and non-circulatory processes.

The present invention may be applied to relatively pure polycarboxylic acid substances or crude polycarboxylic acid substances may be used, for example in the case of phthalic or naphthalic anhydride the so-called converter product, being the reaction product of the catalytic vapor phase oxidation of naphthalene or acenaphthene respectively, may be used and surprising as it may seem most of the impurities do not affect the reaction, thus making for important economy as the cost of purifying the raw material may be partly or completely eliminated. It is even possible to sublime polycarboxylic acid substances such as for example crude phthalic or naphthalic anhydride in a stream containing hydrogen and oxides of carbon and condense out part of the polycarboxylic acid substance in a very pure state by maintaining a condenser chamber at a temperature which permits condensation of the polycarboxylic acid substance, being artificially maintained at a predetermined temperature sufficiently high to keep practically all of the impurities in a volatile form. It should be understood that I do not claim in the present application the production of aldehydes and monocarboxylic acid from crude polycarboxylic acid substances generally this forming a part of the subject matter of my co-pending application Serial No. 362,866 filed May 13, 1929. On the contrary the present invention is limited to the production of aldehydes and acids from polycarboxylic acid substances by the utilization of a gas stream containing both hydrogen or other reducing gas and oxides of carbon.

The amount of hydrogen present will vary, depending on the reaction conditions and on the product desired. Where the amount of hydrogen is relatively small, and especially where carbon dioxide is used as the oxide of carbon, the monocarboxylic acids are obtained in excellent yields as the main product. Where, however, larger amounts of hydrogen are used the corresponding aldehydes are obtained in larger quantities sometimes as the major product depending on the catalyst used.

The present invention can also be carried out in the presence of steam and very satisfactory results are obtained when steam forms one component of the gas mixture. It is, however, an advantage of the present invention that steam is not in any way essential and can be omitted without any lowering of the yield, an important economic advantage as reactions taking place in the presence of steam present serious difficulties in the condensation of the reaction products for if the temperature is sufficiently high to assure that all of the steam remains in the vapor phase losses of the volatile products are a serious factor.

Contact masses which may be used in the present invention are very numerous, for not only can contact masses containing the ordinary catalysts favoring the splitting off of carboxy groups be used but many substances which have hitherto been supposed to have little or no catalytic power but which are highly porous, such as certain base exchange bodies, silica gel, etched quartz fragments, filter stones, active carbons, are excellent contact masses and probably owe at least part of their activity to their highly porous physical structure. Other contact masses used are of widely varying types including the actual carboxy splitting components, such as oxides of thorium, other rare earths, beryllium, aluminum, cadmium, zirconium, titanium, alkali and alkaline earths, and the like which may be associated with components which are reduction catalysts, dehydration catalysts, dehydrogenation catalysts, or which by their physical character of high porosity or capillarity act as physical catalysts or activators. The non-carboxy-splitting catalysts, such as reduction catalysts, dehydrogenation catalysts, dehydration catalysts and the like are also important.

Among these groups are included those which favor catalytic reduction or hydrogenations, such as compounds or elements of various metals, such as zinc, copper, silver, gold, iron, cobalt, manganese, thallium, lead, metals of the platinum group, tin, and the like. Many of the catalytic components which are carboxy-splitting catalysts favor dehydration and may, therefore, be considered as composite catalysts. In some contact masses it is desirable to include components which are oxidation catalysts such as those containing metal elements of the 5th and 6th groups of the periodic system, such as vanadium, columbium, tantalum, bismuth, manganese, chromium, molybdenum, tungsten, uranium, etc. Salts of the metal acids are very effective.

Metal alloys can also be used as contact masses. Examples are various alloys of iron, such as ferrochrome, ferrotungsten, ferrotitanium, ferromolybdenum, ferrovanadium, ferromanganese, silico-ferromanganese, aluminum-silico-ferromanganese, copper alloys, such as brass, bronze, aluminum bronze, aluminum alloys such as duralumin and the like, alloys containing beryllium, magnesium and the like.

Many minerals containing effective catalytic elements are also of importance as contact masses; thus for example titanium minerals such as rutile, ilmenite and the like, may be used, copper ore, zircite, zircon, minerals containing rare earths, etc. The minerals are frequently of very desirable physical structure and many of them form contact masses equal to and in some cases better than artificial contact masses.

The physical catalysts include all porous and capillary substances, such as kieselguhr, pumice, porous rocks of volcanic or eruptive origin, zeolites (natural and artificial), non-silicious base exchange bodies, leached derivatives of base exchange bodies such as glaucosil, and the like.

Other advantageous contact masses are the undiluted and especially the diluted base exchange bodies, such as two-component zeolites, which are the reaction products of at least one silicate with one or more metallates or one or more metal salts the basic radicals of which are metals capable of forming part of the non-exchangeable nucleus of a zeolite; multi-component zeolites, that is to say the reaction products of at least one silicate, at least one metallate and at least one salt, the basic radical of which is capable of entering into the non-exchangeable nucleus of a zeolite; non-silicious base exchange bodies and the like; derivatives of base exchange bodies, such as their reaction products with compounds containing acidic radicals capable of reacting with a base exchange body to form salt like bodies; leached base exchange bodies, etc. Catalytically effective components may be physically associated with the base exchange body or chemically combined therein in exchangeable form, in non-exchangeable form or in the form of acid radicals in salt like bodies.

The invention will be described in greater detail in connection with the following specific examples which illustrate typical embodiments of the invention, but it should be understood that the invention is not limited to the exact details therein set forth.

*Example 1*

200 volumes of quartz fragments, which are retained by a six-mesh screen, are boiled in a 20 N. KOH solution for three hours and then washed with water followed by diluted hydrochloric acid in the proportion of 125 c. c. of concentrated hydrochloric acid per liter of water. The quartz fragments are then heated and agitated and a sodium chloride solution containing 110–120 grams per liter of water is sprayed onto the quartz. The water from the solution is immediately vaporized on coming into contact with the quartz fragments and produces a very uniform coating.

The contact mass is filled into a converter and the mixture of the phthalic anhydride vapors, hydrogen, and carbon dioxide in the proportion of 1 kilo of phthalic anhydride per 3 cbm. of hydrogen and an equal amount of carbon dioxide are passed over the contact mass at 360–400° C., benzoic acid being obtained in good yields.

Instead of using a mixture of hydrogen and carbon dioxide, water gas may be used in the proportion of about 1 kilo of phthalic anhydride to 4–5 cbm. of water gas.

The sodium chloride can be partly or wholly replaced by compounds of lithium, potassium, rubidium, caesium, magnesium, calcium, strontium, or barium, the chlorides, phosphates and borates of these elements being very effective.

The quartz may also be replaced with other carrier materials, such as pumice, bauxite, alunite, diaspore, unglazed porcelain, natural and artificial zeolites and non-silicious base exchange bodies, especially leached zeolites and non-silicious base exchange bodies, asbestos, various minerals, silicates, metals, metal alloys, silica gel, slag wool, etc. Apparently the carrier acts partly as a catalyst and partly as an activator. The reaction may be carried out with or without the addition of steam.

Example 2

200 volumes of crushed pumice stone retained on a six-mesh screen are coated with 10 parts by weight of zinc oxide in the form of the hydroxide by dissolving 36.5 parts of zinc nitrate with 6 mols of water in 250 volumes of water, precipitating out the hydroxide with concentrated ammonia, filtering, washing and forming a slurry of the cake in 220 volumes of distilled water. The suspension is sprayed onto the pumice, which is heated. The pumice may advantageously be treated with diluted nitric acid before use and dried.

The contact mass is placed in a converter and a mixture of phthalic anhydride, hydrogen, and carbon dioxide in the ratio of 3 kilos of phthalic anhydride vapors to 7 cbm. of hydrogen and about 5 cbm. of carbon dioxide are passed over the contact mass at between 350 and 450° C., preferably between 380 and 400° C. Large quantities of benzoic acid are obtained at the lower temperatures and when higher temperatures are used benzaldehydes are obtained in considerable quantities. Steam may be used, but only where benzoic acid is desired as the only product.

Instead of using carbon dioxide, carbon monoxide may be produced in statu nascendi for example, by the decomposition of oxalic acid or from esters of oxalic acid.

The hydrogen may be replaced with other reducing gases or vapors, such as vapors of methyl alcohol. In such cases benzoic acid of excellent purity is obtained having a melting point of 123–124° C. and a boiling point of 248–250° C. Methyl benzoate having a boiling point of 198–200° C. is also obtained in larger or smaller quantities; the main product, however, is benzoic acid. Similar results are obtained when various fuel or illuminating gases are used. The zinc in the contact mass may be partly or wholly replaced by beryllium, cadmium, boron, aluminum, titanium, zirconium, tin, lead, thorium, cerium and other rare earths. The elements may be present as oxides or salts or other compounds with or without carrier materials. Other elements of the periodic system may also be present in the contact masses and many minerals form excellent contact masses. Examples of such minerals are cryolite, spinel, corundum, topaz, witherite, barite, calcite, magnesite, dolomite, vanadinite, apatite, borax, carnallite, feldspar, muscovite, rutile, ilmenite, titanite, zircon, thorite, pyromorphite, and the like.

Circulatory processes are particularly effective with the catalysts described in this example as larger excesses of reducing gas and oxides of carbon may be used, and excellent yields can be obtained.

Example 3

25.75 parts of copper nitrate with 3 mols of water are dissolved in 120 volumes of distilled water, or a corresponding amount of copper nitrate is suspended in water. The copper suspension, or solution is sprayed onto 200 volumes of pumice fragments, which are heated sufficiently so that the water of the dispersion is rapidly vaporized on striking the pumice fragments. A uniform coating is obtained, and the contact mass is then treated with reducing gases such as hydrogen, water gas, methyl alcohol or methyl formate vapors. The contact mass is filled into a converter, and a mixture of phthalic anhydride vapors and hydrogen, in the ratio of 2.5 kilos of phthalic anhydride per 3 cbm. of hydrogen and 12 cbm. of carbon monoxide is passed over the contact mass at 400°. The reaction product is fractionally condensed, benzaldehyde being the main product in the first condensing chamber while some benzoic acid is produced. The yield of benzaldehyde is good and no traces of phthalic anhydride are discernible. Small traces of brown oily materials of indeterminate constitution are obtained as impurities which however, from their odor appear to contain condensation products.

If steam is added to the mixture of the phthalic anhydride vapors and hydrogen, benzoic acid of high purity is obtained, which can be used directly for the preparation of esters such as methyl, ethyl, butyl, benzyl, amyl or cyclohexyl benzoates. Part or all of the copper in the contact mass may be replaced by iron, cobalt, lead, silver or gold. The elements may be present as such or in the form of oxides or salts.

Some of these contact masses partially decompose the product, and small quantities of benzol, benzophenone, diphenyl, anthraquinone, anthracene, 9-phenyl-fluorene. The addition of salts of the alkali and alkaline earth metals considerably improve the action of the contact masses for the production of benzoic acid and benzaldehyde.

Instead of using phthalic anhydride, substituted phthalic anhydrides such as halogen, nitro or halogen-nitro phthalic anhydrides may be used, the corresponding benzoic acids and benzaldehydes being obtained, but in the case of nitrophthalic anhydrides considerable reduction takes place so that the amino compounds are obtained in considerable quantity.

Example 4

12 parts of freshly precipitated $Fe_2O_3$ are suspended in 150 parts of water, and 8 parts of potassium chloride are dissolved in the suspension. The suspension is then coated onto roughened quartz fragments, quartz filter stones, pumice fragments or unglazed porcelain fragments. The contact masses may then be directly used for the transformation of phthalic anhydride to benzoic acid and benzaldehyde. Thus for example, if a mixture of phthalic anhydride vapors with reducing gases, such as water gas, methanol vapors mixed with carbon monoxide, illuminating gas, ethylene mixed with carbon monoxide and the like, in the ratio given in Example 3 is passed over the contact mass at 360–400° C. benzoic acid and benzaldehyde is obtained with yields of between 80 and 99% based on the phthalic anhydride consumed.

Any other catalytic elements having high activity for reduction or hydrogenation can be used to replace part or all of the iron, thus for example, cobalt, nickel, copper, silver, gold, lead, thallium, zinc, may be used, singly or in admixtures, especially when associated with stabilizing compounds such as the salts of the alkali forming metals. The potassium chloride described above can be substituted partly or wholly by other salts of potassium, or salts of lithium, sodium, rubidium, caesium, magnesium, calcium, strontium, or barium, may be used. Suitable salts, in addition to the chlorides, are phosphates, nitrates and some sulfates.

The contact masses may also be modified further by the addition of components containing one or more of the elements aluminum, beryllium, titanium, strontium, zirconium or tin. These components may be considered to enhance or promote the action of the stabilizers in these specific contact masses.

If the loadings mentioned above are exceeded smaller or larger amounts of unreacted phthalic anhydride are obtained in addition to the benzoic acid and benzaldehyde. The two acids can be easily separated by continuous leaching with benzol, chloroform or other solvents which preferentially dissolve benzoic acid. Another very effective method for separating the two acids, where they are obtained practically anhydrous, consists in esterifying them with the ordinary alcohols such as methyl, ethyl, propyl, isopropyl, butyl, isobutyl, hexyl, benzyl, cyclohexyl and the like. The corresponding esters are obtained, and possess very markedly different boiling points, so that a ready separation by fractional distillation is practicable. Thus for example, methyl benzoate has a boiling point of 199.2° C., whereas dimethyl phthalate has a boiling point of 282° C., the difference in boiling point, 82.8° C., is so great that effective separation by fractional distillation can be effected. The mixture of the esters may also be used directly, for some purposes, such as, for example, as plasticizers for resins and other plastic compositions such as those containing cellulose esters. After separation of the esters they can be saponified and a chemically pure benzoic acid can thus be obtained, while the alcohol can be recovered and reused.

Example 5

12 parts of freshly precipitated aluminum vanadate are suspended in 120 parts of water and then coated onto comminuted unglazed porcelain, for example by the method described in the foregoing examples. The contact mass is filled into a converter, and phthalic anhydride vapors mixed with reducing gases such as illuminating gas, water gas, etc., together with some steam, in the ratio of 3.5 kilos of phthalic anhydride to 8–10 cbm. of water gas, are passed over the contact mass under reaction conditions such as those described in the foregoing examples. A technical grade of benzoic acid is obtained and the yield amounts to 80–86% of the theory based on the phthalic anhydride consumed.

Instead of using phthalic anhydride vapors, vapors of the esters of phthalic acid, such as dimethyl phthalate and diethyl phthalate may be used with or without reducing gases such as hydrogen and with or without small amounts of steam. The resulting products are benzoic acid and methyl benzoate or ethyl benzoate, respectively, together with small amounts of benzaldehyde.

The salt used may be partly or wholly replaced by other salts of the metal acids of the 5th and 6th groups of the periodic system, such as columbic, tantalic, bismuthic, chromic, molybdic or tungstic acid. The salts may be present singly or in admixture. The basic radical of the salts may contain one or more of the following elements: aluminum beryllium, magnesium, calcium, zinc, strontium, cadmium, barium, copper, silver, titanium, zirconium, tin, lead, iron, cobalt, nickel, manganese. Tin salts of chromic acid are particularly effective. In many cases the contact mass composition may be stabilized by the addition of alkali or alkaline earth metal salts.

Example 6

A solution of 30–36° Bé. sodium waterglass, diluted with 10–12 volumes of water, in an amount containing 48–50 parts of $SiO_2$ is treated with sufficient 20% ammonia water until the cloudiness which first forms clears up. 29 parts of copper nitrate with 6 mols of water are dissolved in water to form a 10 N. solution, and sufficient strong ammonia water is added until the precipitate which first forms again dissolves up to a deep blue solution. The cuprammonium solution is then poured into the waterglass with vigorous agitation. A 10% aluminum nitrate solution is prepared and gradually added to the mixture of waterglass and cuprammonium nitrate solution until the reaction mixture is just neutral to phenolphthalein. The reaction product is a deep blue gel, which is pressed and dried, and then forms greenish blue fragments with conchoidal facture.

Instead of using a cuprammonium complex other complex compounds may be used, or metallates such as sodium aluminate, sodium zincate, sodium chromite, or sodium plumbite, may be used, singly or in admixture. The aluminum nitrate may also be replaced partly or wholly by one or more metal salt solutions such as those containing titanium, zirconium, zinc, iron, chromium, vanadium or tungsten.

Contact masses prepared as described above consist of three component zeolites, or, if solution 2 is not used, of two component zeolites. These zeolites may be used directly as contact masses or they may be subjected to a preliminary treatment with a 5% calcium chloride or copper nitrate solution or similar salt solutions containing other elements such as iron, cobalt, nickel, zinc, magnesium, barium or lead. The exchangeable alkali metal bases are replaced by these salts, and the process may be preferably carried out by first hydrating the zeolites with water before commencing base exchange.

The zeolites described above can advantageously be diluted with most various diluents, such as kieselguhr, pumice meal, ground quartz, glaucosil (the acid leached residue of greensand), minerals, etc. The base exchange bodies may also be coated onto artificial or natural carrier bodies, or formed thereon in situ. Examples of such carrier fragments are filter stones, aluminum granules, granules of metal alloys such as ferrosilicon, ferrovanadium, ferrochrome, and the like. Alkalies or alkaline earths may be used as cementing agents.

Similar contact masses may be obtained by treating the zeolites, especially after exchanging part of the exchangeable alkali for other elements, with acids such as hydrochloric acid, phosphoric acid, and especially the metal acids of the 5th and 6th groups of the periodic system, in order to form so-called salt-like bodies with these acids.

Other effective contact masses are obtained by leaching the base exchange bodies produced above with dilute acids, and the amount of leaching may be greatly varied. When the leaching is carried to the limit a very reactive silicic acid is obtained, which is also an effective catalyst for the process.

Phthalic anhydride vapors mixed with hydrogen and steam in the ratio of 1 kilo of phthalic anhydride to 4–6 cbm. of hydrogen and 20–30 cbm. of carbon monoxide or dioxide and 15–20% by weight of water are passed over any of the contact masses described above at temperatures preferably around 380° C. A product is obtained which consists mainly in benzoic acid, the yield being about 90% of the theory based on the amount of phthalic anhydride consumed.

*Example 7*

Freshly precipitated aluminum hydroxide containing 10 parts of $Al_2O_3$ is dissolved in a 2 N. sodium hydroxide solution to form sodium aluminate with a 10% excess of caustic soda. 6 parts of aluminum sulphate with 18 mols of water are dissolved in 200 parts of water and 17–18 parts of "Celite" brick refuse, or other material such as activated carbon, polysilicates and the like are stirred in. Examples of polysilicates which are well suited are those of calcium, copper, iron, zinc, titanium, zirconium, and thorium, both natural and artificial products being usable. The aluminum sulphate is then gradually added to the aluminate solution with vigorous agitation until the mixture remains strongly alkaline to litmus and preferably neutral to phenolphthalein. The reaction product is freed from the mother liquor, dried at temperatures below 100° C. and broken into small fragments.

A modified contact mass may be obtained by hydrating the fragments by means of trickling water over them and then subjecting them to base exchange by trickling 5 to 10% salt solution thereover. By this means one or more bases such as those containing iron, copper, cobalt, silver, lead, manganese or thorium may be introduced. The base exchange bodies obtained may also be impregnated with phosphoric acid or chromic acid in order to form the corresponding salt-like body.

Other metallates may replace partly or wholly the aluminate, and many other metal salts may replace the aluminum sulfate, partly or wholly.

The contact mass compositions obtained above may also be leached with dilute organic or inorganic acids such as 1 to 2% hydrochloric acid, enhancing the porosity of the contact masses.

A converter is filled with contact mass prepared as described above and phthalic anhydride vapors mixed with hydrogen and steam in the proportion of 1 kilo of phthalic anhydride to 3–5 cbm. of hydrogen and 10–15 cbm. of carbon monoxide and 30 kilos of steam are passed over the contact mass at 360–390° C. Benzoic acid is obtained with a conversion yield of about 85%.

The above contact mass compositions may also be used for the production of other monocarboxylic acids and their derivatives from other polycarboxylic acid substances. Thus, for example, naphthalic anhydride can be split to give good yields of naphthoic acid; diphenic acid may be transformed into phenylbenzoic acid; maleic acid may be transformed into acrylic acid, with the production of some propionic acid. Succinic acid may be transformed into propionic acid, and pyrotartaric acid may be transformed into butyric acid. The reaction conditions are similar to those described above, and it has been found that the presence of steam appears to favor the reaction. These splitting reactions are preferably carried out in converters of aluminum or copper.

*Example 8*

Instead of using solid catalysts, metal carbonyls may be used as gaseous catalysts; thus, for example, phthalic anhydride vapors admixed with hydrogen, with or without steam or with other reducing gases as described in the foregoing examples are heated in contact with metal carbonyls such as iron carbonyl or a mixture of iron and nickel carbonyl. The carbonyls may be ready formed or produced in situ. Benzaldehyde or a mixture of benzaldehyde and benzoic acid is ordinarily obtained. As an example of such a reaction, gases containing carbon monoxide, such as water gas, may be passed over iron at a suitable temperature to produce a certain amount of iron carbonyl, then mixed with phthalic anhydride vapors and passed through a hot zone where the temperature is maintained preferably between 360–380° C. Benzoic acid and benzaldehyde are the main products, and yields up to 85% of the theory are obtained.

Instead of using gaseous catalyst, powdered catalyst may be used, and may be mixed with phthalic anhydride and sprayed into reducing gases such as hydrogen, with or without steam or methyl alcohol, the spraying being into a hot zone, preferably about 360° C. Benzoic acid is obtained in good yields, with or without some benzaldehyde, depending on the duration of the heating.

It will be evident that reducing gases which contain serious poisons for hydrogenations and reductions are effectively utilizable for the reactions of the present invention without purification.

*Example 9*

Polycarboxyl acid substances may be split to monocarboxylic acids in the liquid phase. Thus, for example, phthalic anhydride is filled into an autoclave, with or without a solvent such as cyclohexane or tetraline, and 3 to 5% of copper carbonate precipitated in kieselguhr is added. The autoclave is preferably lined with aluminum, copper, zinc or alloys of chromium. The mixture is heated in the autoclave to 200–250° C., and gases containing hydrogen and oxides of carbon are pumped in at a pressure of about 10–20 atmospheres. The heat is maintained for from 3 to 10 hours, and at the end of the reaction most of the phthalic anhydride is converted into benzoic acid with some amounts of benzaldehyde, which vary with the reaction conditions.

Instead of using copper as a catalyst, zinc, aluminum, titanium, zirconium, vanadium, thorium, chromium, manganese or cobalt may be present as catalysts, singly or in admixture.

Instead of using hydrogen containing gases, phthalic anhydride mixed with methyl alcohol and carbon monoxide and the finely divided catalysts mentioned above may be heated in a closed autoclave at 250° C., large amounts of the phthalic anhydride being transformed into benzoic acid and methyl benzoate. Other solvents, such as cyclohexane or tetraline, may be present in addition to the methyl alcohol and it is sometimes desirable to introduce some hydrogen. The methyl alcohol may be anhydrous or may contain water, it being understood that the present reaction may be carried out in the liquid phase in the presence of water, which of course during the reaction is normally, though not necessarily, present in the gaseous phase.

What is claimed as new is:

1. A method of producing monocarboxy substances included in the group consisting of monocarboxylic acids, monoaldehydes, esters of monocarboxylic acids, from polycarboxy substances included in the group consisting of polycarboxylic acids, polycarboxylic acid anhydride, mono and diesters of polycarboxylic acids, which comprises bringing about reaction at reaction temperature between the polycarboxy substance and a reducing gas mixture containing at least one oxide of carbon and at least one reducing gas other than an oxide of carbon in the presence of a decarboxylating catalyst.

2. A method of producing monocarboxy substances included in the group consisting of monocarboxylic acids, monoaldehydes, esters of monocarboxylic acids, from polycarboxy substances included in the group consisting of polycarboxylic acids, polycarboxylic acid anhydride, mono and diesters of polycarboxylic acids, which comprises bringing about reaction at reaction temperature between the polycarboxy substance and a reducing gas mixture containing at least one oxide of carbon and hydrogen in the presence of a decarboxylating catalyst.

3. A method according to claim 1 in which the gas mixture is anhydrous.

4. A method according to claim 1 in which the decarboxylation catalyst also contains elements which act as reducing catalysts.

5. A method of producing monocarboxy substances included in the group consisting of monocarboxylic acids, monoaldehydes, esters of monocarboxylic acids, from polycarboxy substances included in the group consisting of polycarboxylic acids, polycarboxylic acid anhydrides, mono and diesters of polycarboxylic acids, which comprises bringing about reaction at reaction temperature between the polycarboxy substance and a reducing gas mixture containing at least one oxide of carbon and at least one reducing gas other than an oxide of carbon in the presence of a decarboxylating catalyst containing at least one substance included in the group consisting of base exchange bodies, leached base exchange bodies, salt-like derivatives obtained by the reaction of base exchange bodies with acidic radicals capable of uniting therewith.

6. A method of transforming a phthalic substance included in the group consisting of phthalic acids, phthalic anhydride, mono and diesters of phthalic acids, into the substance containing an oxomethylbenzene nucleus which comprises bringing about reaction at reaction temperature between the phthalic substance and a reducing gas containing at least one oxide of carbon, and at least one reducing gas which is not an oxide of carbon in the presence of a decarboxylation catalyst.

7. A method of transforming a phthalic substance included in the group consisting of phthalic acids, phthalic anhydride, mono and diesters of phthalic acids, into a substance containing an oxomethylbenzene nucleus which comprises bringing about reaction at reaction temperature between the phthalic substance and a reducing gas containing at least one oxide of carbon and hydrogen in the presence of a decarboxylation catalyst.

8. A method according to claim 6 in which the reducing gases are anhydrous.

9. A method of transforming a volatile phthalic acid substance included in the group consisting of phthalic acids, phthalic anhydride, mono and diesters of phthalic acids, into a substance containing an oxomethylbenzene nucleus which comprises causing the vapors of the phthalic substance admixed with a reducing gas containing at least one oxide of carbon and at least one reducing gas which is not an oxide of carbon, to pass over a decarboxylation catalyst at reaction temperature.

10. A method according to claim 9 in which the gas mixture is anhydrous.

11. A method according to claim 9 in which the decarboxylation catalyst contains at least one element which is a reducing catalyst.

12. A method of transforming a volatile phthalic acid substance included in the group consisting of phthalic acids, phthalic anhydride, mono and diesters of phthalic acids, into a substance containing an oxomethylbenzene nucleus which comprises causing the vapors of the phthalic substance admixed with a reducing gas containing at least one oxide of carbon and hydrogen to pass over a decarboxylation catalyst at reaction temperature.

13. A method of producing aldehydes from polycarboxy substances included in the group consisting of polycarboxylic acids, polycarboxylic acid anhydrides, mono and diesters of polycarboxylic acids, which comprises causing the polycarboxy substance to react at reaction temperature with a reducing gas containing at least one oxide of carbon and a reducing gas which is not an oxide of carbon in the presence of a decarboxylation catalyst containing an element which is a sufficiently strong reduction catalyst to reduce monocarboxylic acids to aldehydes at the reaction temperature.

14. A method of producing aldehydes from polycarboxy substances included in the group consisting of polycarboxylic acids, polycarboxylic acid anhydrides, mono and diesters of polycarboxylic acids, which comprises causing the polycarboxy substance to react at reaction temperature with a reducing gas containing at least one oxide of carbon and hydrogen in the presence of a decarboxylation catalyst containing an element which is a sufficiently strong reduction catalyst to reduce monocarboxylic acids to aldehydes at the reaction temperature.

15. A method of producing benzaldehydes from phthalic substances included in the group consisting of phthalic acids, phthalic anhydride, mono and diesters of phthalic acids which comprises causing the phthalic substance to react at reaction temperature with a reducing gas containing at least one oxide of carbon and a reducing gas which is not an oxide of carbon, in the presence of a decarboxylation catalyst which contains an element which is a sufficiently strong reduction catalyst to reduce benzoic acids to benzaldehydes at the reaction temperature.

16. A method of producing benzaldehydes from phthalic substances included in the group consisting of phthalic acids, phthalic anhydride, mono and diesters of phthalic acids which comprises causing the phthalic substance to react at reaction temperature with a reducing gas containing at least one oxide of carbon and hydrogen in the presence of a decarboxylation catalyst which contains an element which is a sufficiently strong reduction catalyst to reduce benzoic acids to benzaldehydes at the reaction temperature.

17. A method of producing benzaldehydes from volatile phthalic substances included in the group consisting of phthalic anhydride, mono and diesters of phthalic acids which comprises causing the vapors of the phthalic substances mixed with a reducing gas containing at least one oxide of carbon and a reducing gas which is not an oxide of carbon, to react at reaction temperature in the presence of a decarboxylation catalyst which contains an element that is a sufficiently strong reduction catalyst to reduce benzoic acids to benzaldehydes at the reaction temperature.

18. A method of producing benzaldehydes from volatile phthalic substances included in the group consisting of phthalic anhydride, mono and di-esters of phthalic acids which comprises causing the vapors of the phthalic substances mixed with a reducing gas containing at least one oxide of carbon and hydrogen to react at reaction temperature in the presence of a decarboxylation catalyst which contains an element that is a sufficiently strong reduction catalyst to reduce benzoic acids to benzaldehydes at the reaction temperature.

ALPHONS O. JAEGER.